United States Patent
Polidor

(10) Patent No.: US 8,400,633 B2
(45) Date of Patent: Mar. 19, 2013

(54) METHOD OF INSPECTING TEST PARTS WITH AN OPTICAL COMPARATOR HAVING DIGITAL GAGE

(75) Inventor: Edward T. Polidor, Webster, NY (US)

(73) Assignee: Quality Vision International, Inc., Rochester, NY (US)

( * ) Notice: Subject to any disclaimer, the term of this patent is extended or adjusted under 35 U.S.C. 154(b) by 0 days.

(21) Appl. No.: 13/588,055

(22) Filed: Aug. 17, 2012

(65) Prior Publication Data

US 2012/0307246 A1      Dec. 6, 2012

Related U.S. Application Data

(63) Continuation of application No. 12/497,097, filed on Jul. 2, 2009, now Pat. No. 8,269,970.

(51) Int. Cl.
*G01B 9/08* (2006.01)
(52) U.S. Cl. .................... 356/392; 356/393
(58) Field of Classification Search ........... 356/388–398
See application file for complete search history.

(56) References Cited

U.S. PATENT DOCUMENTS

| | | | |
|---|---|---|---|
| 3,339,076 A | 8/1967 | Hilal | |
| 3,888,593 A * | 6/1975 | Kempf | 356/393 |
| 4,567,478 A | 1/1986 | Schwab | |
| 5,715,021 A | 2/1998 | Gibeau et al. | |
| 5,886,788 A | 3/1999 | Kobayashi | |
| 6,000,801 A | 12/1999 | Dillon et al. | |
| 6,147,758 A | 11/2000 | Okabe et al. | |
| 6,175,417 B1 | 1/2001 | Do et al. | |
| 6,195,165 B1 | 2/2001 | Sayegh | |
| 6,356,300 B1 | 3/2002 | Shiba | |
| 6,597,410 B1 * | 7/2003 | Doany et al. | 348/744 |
| 6,945,652 B2 | 9/2005 | Sakata et al. | |
| 7,058,109 B2 | 6/2006 | Davis | |
| 7,064,880 B2 | 6/2006 | Mushika | |
| 7,142,257 B2 | 11/2006 | Callison et al. | |
| 7,306,339 B2 | 12/2007 | Kaufman et al. | |
| 7,433,796 B2 | 10/2008 | Behan et al. | |
| 7,519,501 B2 | 4/2009 | Palmateer | |
| 7,528,968 B2 | 5/2009 | Matsumiya et al. | |
| 7,901,096 B2 | 3/2011 | Klepp | |
| 8,269,970 B2 | 9/2012 | Polidor et al. | |

(Continued)

FOREIGN PATENT DOCUMENTS

| | | |
|---|---|---|
| CA | 2106146 A1 | 4/1994 |
| EP | 0930499 A1 | 7/1999 |

OTHER PUBLICATIONS

International Search Report and Written Opinion of the International Searching Authority issued in corresponding International Application No. PCT/US2010/032871 mailed Dec. 16, 2010 (10 pages).

(Continued)

*Primary Examiner* — Gregory J Toatley
*Assistant Examiner* — Jarreas C Underwood
(74) *Attorney, Agent, or Firm* — Stephen B. Salai, Esq.; Thomas B. Ryan; Harter Secrest & Emery LLP

(57) ABSTRACT

An optical comparator arranged for rear projection onto a viewing screen combines an optical projector that projects an optical image of a test part under inspection onto the viewing screen with a video projector that projects an optical image of a pixilated template pattern containing illustrated specifications of the test part onto the same viewing screen. The images of the test part and the pixilated template pattern are projected concurrently onto the viewing screen for visually comparing the form of the test part against its specified form.

9 Claims, 6 Drawing Sheets

U.S. PATENT DOCUMENTS

| | | | |
|---|---|---|---|
| 8,275,452 B2 * | 9/2012 | MacAdam et al. | 600/523 |
| 2002/0067535 A1 * | 6/2002 | Trezza | 359/298 |
| 2003/0164945 A1 * | 9/2003 | Lee | 356/393 |
| 2005/0171707 A1 | 8/2005 | Easley et al. | |
| 2005/0206890 A1 | 9/2005 | Hurst et al. | |
| 2006/0098551 A1 | 5/2006 | Carver et al. | |
| 2006/0245636 A1 | 11/2006 | Kitamura et al. | |
| 2007/0014318 A1 | 1/2007 | Hajjar et al. | |
| 2007/0109558 A1 | 5/2007 | Harding et al. | |
| 2008/0024732 A1 | 1/2008 | Klepp | |
| 2008/0138916 A1 * | 6/2008 | Mitsui | 438/16 |
| 2008/0252904 A1 | 10/2008 | Matsumiya et al. | |
| 2009/0128716 A1 | 5/2009 | Nagashima et al. | |
| 2009/0128717 A1 | 5/2009 | Nagashima et al. | |
| 2010/0225666 A1 | 9/2010 | Beauchemin | |

OTHER PUBLICATIONS

MICROVU, Projecteue de profil numerique, Extract from the article in Machinery Production 869 (May 15, 2008), p. 15 and Google English Translation of article extract (2 pages plus translation).

VISIONx Inc., VisionGuage Digital Optical Comparator/Digital Profile Projector, http://www.visionxinc.com/software-systems-machines/digital-optical-comparators.html, 5 pages, 2009.

* cited by examiner

METHOD OF INSPECTING TEST PARTS WITH AN OPTICAL COMPARATOR HAVING DIGITAL GAGE

RELATED APPLICATIONS

This is a continuation of U.S. patent application Ser. No. 12/497,097 filed on Jul. 2, 2009, which application is hereby incorporated by reference.

TECHNICAL FIELD

The invention relates to the field of optical metrology and particularly to the gaging of test parts through optical imaging systems that provide for comparing the test parts against templates or other representations of the test parts.

BACKGROUND OF THE INVENTION

Optical comparators, particularly of a type that project a shadow image (e.g., a negative image) or an obliquely illuminated image of a test part onto a screen overlaid by a template of the test part, have enjoyed widespread acceptance as robust and reliable forms of measurement by providing measurement results in a visually verifiable form. Differences between projected edge features of the test part and one or more tolerance boundaries of the same features inscribed on the templates are readily apparent on the comparator screens. While numerical data can also be extracted by monitoring motions of the test parts against calibrated images of the test parts appearing on the comparator screens, the numerical data can be verified for reasonableness against estimates made by visually inspecting the edges of the test part against the template boundaries or other edge features of at least approximately known size appearing on the screens.

The accuracy with which visual comparisons can be made depends largely on the accuracy with which the templates can be made. The optics of the optical comparators can be carefully calibrated and optically corrected to present largely distortion-free images of test parts mounted within the viewing apertures of the optical projection systems. However, different templates can be required for different test parts or more complex templates in the form of chart gages can be constructed for measuring ranges of related edge features among corresponding sets of test parts. More than one template can be required for measuring multiple views or edge features of the same test parts. The templates can be expensive to manufacture to required accuracy and can require special storage and handling provisions to preserve the templates in working condition. Time must be allotted for ordering new or replacement templates, and even minor revisions to the intended form or tolerance definitions of test parts can require the ordering of new templates.

Efforts have been made to replace optical projection comparators with digital camera based comparators for making similar visual comparisons on computer monitors. Most advantageously, physical templates can be replaced by digital representations of the test parts generated on the computer monitors by extracting boundary information from computer-aided design (CAD) specifications that define the intended outlines of the test parts. Digital images of the test parts captured by digital cameras are also generated on the same computer monitors for making comparisons against the digitally generated templates. However, the computer monitors present pixilated images that significantly limit the precision with which the comparisons can be made for given size images appearing on the computer screen. Since both the templates and the test parts must be matched to the same scale on the computer screens, the resolution of the templates and test parts match each other at different digital magnifications. Thus, fine comparisons can be difficult to make to customary certainty and can require visual inspection of smaller segments of the test parts within the same size field of view. The digital conversion of the test part images contributes additional systematic and random errors that reduce the reliability of the measurements as well as the perceived robustness previously derived from comparing actual images of test parts against reference datum.

SUMMARY OF THE INVENTION

The invention among its preferred embodiments digitally generates templates for optical projection onto the viewing screens of optical comparators concurrently with the optical projection of images of test parts onto the same viewing screens. The accuracy with which the images of the test parts are projected onto the viewing screens is largely a function of the illuminating and projection optics and is not constrained by any intervening digital pixilation of test part images. Although optically projected onto the same viewing screens, the templates are digitally generated having regard to the projected pixel size on the viewing screens. As such, the invention preserves the reliability and robustness long associated with optical comparators while obviating the need for physical templates. The combined optical projections of the test part and the digitally generated template also allow for overlapping color based comparisons for providing more easily discernable indications as to whether test parts are within tolerance.

One example of an optical comparator in accordance with this invention includes a viewing screen, an optical projector for projecting an optical image of a test part under inspection onto the viewing screen, and a video projector for projecting an optical image of a pixilated template pattern containing illustrated specifications of the test part onto the viewing screen. The video projector preferably includes a digital display engine for generating the pixilated template pattern. A first illuminator illuminates the test part and a second illuminator illuminates the digital display engine. The optical projector and the video projector are related so that the images of the test part and the pixilated template pattern are projected concurrently onto the viewing screen at a matching scale.

A program-driven interface between (a) one or more digital CAD files containing specifications of the test part and (b) the digital display engine of the video projector can be arranged to convert the specifications in the digital CAD file into the pixilated template pattern in an illustrated form amenable to comparison with the projected optical image of the test part. For example, information concerning the boundaries of the test part, such as may be represented in the digital CAD file as a nominal boundary having a numerically defined tolerance, can be converted into a tolerance zone band appropriately positioned with respect to other CAD-referenced features of the test part in the pixilated template pattern.

For enhancing the optical comparison, the optical image of the test part and the optical image of the pixilated template pattern can be projected in different colors. For example, a negative image of the test part can be projected in a first color, such as green, and an image of pixilated tolerance zone bands can be projected in a second color, such as red. The projections are preferably color additive, and portions of the projected negative image of the test part that are within the projected tolerance zones of the test part appear as a third color, such as yellow. A feature, such as a bore hole, can be seen to be within tolerance when an annular red band surrounds an annular yellow band. The uninterrupted outer red band is an indication that the outer limit of the tolerance zone has not been breached as would be indicated by a green break in the red band outside the zone. The uninterrupted intermediate yellow band is an indication that the inner limit of the tolerance zone has not been breached as it would also be indicated by a black break in the yellow band outside the zone. Based on such an easily discernible color test, multiple features of individual test parts can be inspected concurrently or nearly so to determine if the features are within tolerance.

The interface between the digital CAD files and the digital display engine of the video projector can produce template structures to compensate for resolution limitations of the pixilated template pattern at a given magnification for making sub-pixel comparisons with the projected image of the test part. For example, the location of a boundary line can be more precisely represented by laterally staggered sets of pixels in the pixilated template pattern. A nominal line, which represents the intended boundary, is implicit from the staggered sets of pixels as a line that can be adjudged on the viewing screen to exactly bisect the staggered sets of pixels. The laterally staggered sets of pixels can also be laterally separated by an amount that straddles an intended tolerance zone. The projected image of the test part contains edges whose resolution is not limited by a pixel count and can divide the individual staggered sets of pixels appearing on the viewing screen into different size areas of fractional pixel dimensions that can be compared for a more precise determination of the locations of the edges with respect to the boundary or tolerance zones at a resolution higher than the resolution of the pixels representing the boundary or tolerance zones. Such multi-pixel boundary enhancements can also be used in combination with additive color controls for more easily distinguishing areas of overlap between the boundaries or tolerance zones projected in one color and the image of the test part projected in another color.

Preferably, the optics for projecting the image of the pixilated template pattern onto the viewing screen are sufficiently independent of the optics for projecting the image of the test part onto the viewing screen so that a change in the magnification of the image of the test part does not affect the number of pixels available for imaging the rescaled pixilated template pattern projected onto the viewing screen. The digital display engine of the video projector can magnify the template pattern by generating a digital image of a smaller portion of the template pattern using the same number of pixels, which are projected at the same optical magnification onto the viewing screen. Since a smaller portion of the template pattern is generated by the same number of available pixels, the resolution of the so-magnified template pattern as projected upon the viewing screen is increased. In other words, the same visible spacing between pixels on the viewing screen represents a smaller distance according to the scale of the increased magnification.

The optical projector can project the image of the test part to the viewing screen along a first optical axis, and the video projector can project the image of the pixilated template pattern to the viewing screen along a second optical axis that is inclined to the first optical axis. An optic, such as a segmented lens (e.g., Fresnel lens) or grating, can be overlaid on the viewing screen to combine light energies of the projected images approaching the viewing screen along the first and second optical axes into light energies emanating from the viewing screen along a common viewing axis. The alignment of light energies between the images produced by the optical and video projectors provides for more uniform comparisons of color and contrast throughout the viewing screen.

For purposes of economy and optical alignment, the optical projector and the video projector can share some optics. For example, the optical paths of the optical projector and the video projector can be combined at a beamsplitter so that both the optical image of a test part and the pixilated template pattern are projected along the same optical axis to the viewing screen.

A rotationally adjustable reticle can be aligned with the viewing screen for measuring angular orientations of imaged features of the test part. A communication link can be provided between the reticle and the video projector so that the image of the pixilated template pattern rotates on the viewing screen matching rotational adjustments of the reticle. The optical projector and the video projector are preferably calibrated so that a center point of the reticle corresponds to a center point of the pixilated template pattern. The optical projector preferably includes a magnification adjuster for changing magnification of the image of the test part projected onto the viewing screen. Another communications link can be provided between the magnification adjuster and the video projector so that the image of the pixilated template pattern on the viewing screen changes in magnification matching changes in the magnification of the image of the test part on the viewing screen.

The video projector is also preferably linked to a computer so that the video projector can also project other computer-generated images onto the viewing screen, including an interactive desktop that supports communication protocols with the computer. For example, files containing data relating to the test part or the optical comparator can be accessed through the interface and results displayed on the viewing screen.

Another example of an optical comparator for comparing a test part against design specifications in accordance with this invention includes a support for mounting a test part and a digital image generator for generating a pixilated template pattern containing illustrated specifications of the test part. A first illuminator illuminates the test part and a second illuminator illuminates the digital image generator. Imaging optics project overlapping optical images of the test part and the pixilated template pattern on a viewing screen at a matching scale for visually comparing the test part to the pixilated template pattern.

The imaging optics can include a first objective for producing an image of the test part, a second objective for producing an image of the pixilated template pattern, and a beam combiner for combining the images produced by the first and second objectives. The second objective can have higher power than the first objective for scaling the pixilated template pattern to the test part. The first and second illuminators preferably illuminate the test part and the digital image generator with different color light. The digital display engines of the video projectors preferably include arrays of addressable elements for generating the pixilated template patters. Alternatively, the digital display engines can include laser beam steering devices for tracing the template pattern directly onto the viewing screen or through the intermediacy of focusing optics.

BRIEF DESCRIPTION OF THE DRAWING FIGURES

FIG. 1 is a diagram of an optical comparator for inspecting a test part arranged in accordance with one embodiment of the invention in which an optical projector and a video projector follow entirely different optical paths to a common viewing screen.

FIGS. 2A, 2B, and 2C present front views of the viewing screen with FIG. 2A showing a projected image of the test part, FIG. 2B showing a projected image of a pixilated template pattern, and FIG. 2C showing in an enlarged cut-away view of a combination of the projected images of the test part and the pixilated template pattern for making a visual comparison.

DETAILED DESCRIPTION OF THE INVENTION

Figure 1:
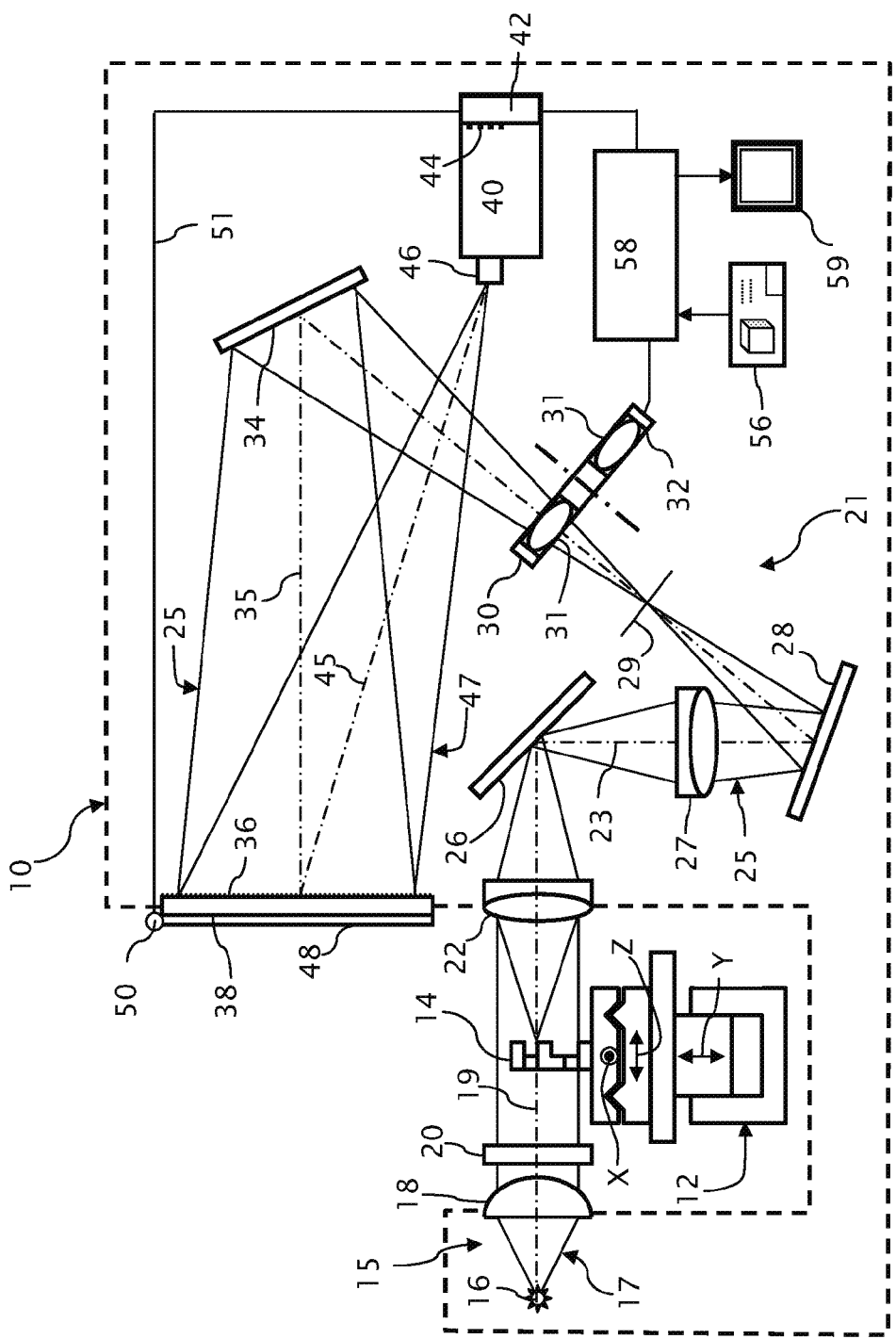

An optical comparator 10, whose outline is depicted by dashed lines in FIG. 1, includes a multi-axis stage 12 for supporting a test part 14. The multi-axis stage 12 is depicted as having three orthogonal axes X, Y, and Z of translation (i.e., linear motion) but could include fewer axes of translation or one or more additional axes of rotation (i.e., angular motion), also preferably orthogonal. Various manual controls (not shown) can be associated with the multi-axis stage 12 to adjust the position of the test part 14, which can also include motors, actuators, or the like for automatically positioning and/or moving the test part 14 under inspection. In addition, at least the linear motion axes X and Y are preferably equipped with graduated linear encoders (not shown) for measuring the changes in the position of the test part 14.

A backlight (profile) illuminator 15 outputs an illumination beam 17. Included within the illustrated backlight illuminator 15 is a light source 16 for producing the beam 17 and a collimator 18 for collimating the illumination beam 17 along an illumination axis 19. The light source 16 can take a number of forms such as light emitting diodes or incandescent or arc lamps. When the light source 16 is a broadband light source, a spectral filter 20 can be used to limit the spectral content of the illumination beam 17. When the light source incompletely or unevenly fills the desired exit pupil of the backlight illuminator 15, one or more diffusers (not shown) can be used, such as a first diffuser at the focal plane of a collimator 18 and a second diffuser between the collimator 18 and the test part 14 to achieve sufficient homogeneity throughout the illumination beam 17. A reflector can also be combined with the light source 16 to improve efficiency. Overall, the illumination beam 17 output from the illuminator 15 is preferably collimated, homogeneous, and monochromatic, preferably within the green color spectrum, which is conventional for optical comparators. Other known types of illuminators could also be provided including a brightfield illuminator for co-axial surface illumination or a darkfield illuminator for oblique surface illumination.

The backlit test part 14, which is preferably subject to manufacture according to predetermined design specifications, blocks portions of the illumination beam 17 in a pattern matching the physical profile of the test part 14. An optical projector 21 collects the remaining portions of the illumination beam 17 propagating along the illumination axis 19 and projects a negative optical image 24 of the test part 14 onto a viewing screen 38 (i.e., a transmitting rear projection screen) as an optical projection beam 25 (see FIG. 2A, for example). The viewing screen 38 preferably has a frosting 36 to provide a viewing plane that renders the projected negative image 24 of the test part 14 visible through a range of viewing angles.

A front relay lens 22 of the optical projector 21 functions as an objective for receiving the shadow pattern of the test part 14 and for forming a primary image of the test part 14, which can be ultimately relayed as the negative image 24 of the test part 14 onto the viewing screen 38. Located along an optical pathway 23 of the optical projector 21 between two beam-folding mirrors 26 and 28, a second relay lens 27 cooperates with the first relay lens 22 for forming an intermediate image 29 of the test part 14. The overall size of the projected negative image 24 in relation to the size of the test part 14 can be controlled by a magnification lens 30, which includes a plurality of different power lenses 31 mounted in a turret 32 for rotating the individual lenses 31 into alignment with the optical pathway 23. A large folding mirror 34 redirects the projection beam 25 along an optical projection axis 35 oriented normal to the viewing screen 38 for forming the negative optical image 24 of the test part 14 on the viewing screen 38.

Also projected onto the viewing screen 38 is a greatly magnified optical image 54 of a pixilated template pattern 44 (see FIG. 2B), preferably in a color that contrasts with the color at which the negative image 24 of the test part 14 is projected onto the viewing screen 38. The pixilated template pattern 44 can be generated within a video projector 40 by a digital display engine 42, which is preferably a spatial light modulator in a form such as a liquid crystal display (LCD) or a digital micromirror device (DMD). For example, the video projector 40 can be a DLP® projector incorporating micromirror array technology from Texas Instruments. High resolution pixel counts are generally preferred but the video projector 40 can also be selected with regard to cost where pixel resolution and optical sharpness can be application matched.

A projection lens 46 of the video projector 40 projects a greatly magnified optical image 54 of the pixilated template pattern 44 onto the viewing screen 38. A video projection beam 47 carrying the optical image 54 propagates along a video projection axis 45 that is inclined to a normal of the viewing screen 38. The inclination of the video projection beam 47 would ordinarily be expected to contribute a so-called "keystone" (trapezoidal) distortion to the projected image 54 of the pixilated template pattern 44. However, the projection lens 46 as related to the pixilated template pattern 44 can be arranged to compensate for the expected keystone distortion so that the image 54 of the pixilated template pattern 44 can be projected onto the viewing screen 38 without any significant distortion. For example, the pixilated template pattern 44 could be inclined with respect to an object plane of the projection lens 46 to correct for the expected distortion or an astigmatic lens could be incorporated into the projection lens 46 to make a similar correction. Any residual keystone error can be corrected by software driving the video projector 40 at the time of initial image calibration or a later recalibration of the projected image 54.

Although the video projector 40, as shown in FIG. 1, projects the digital image 54 of the pixilated template pattern 44 directly onto the back of the viewing screen 38, the image 54 can also be projected via one or more mirrors (not shown) for orienting the video projector 40 in a different position within the optical comparator 10. The one or more mirrors can be made adjustable for aligning the center of the digital image 54 with the center of the viewing screen 38. The use of such mirrors for folding the path of the video projector 40 can produce an image rotation on the viewing screen 38 that can be corrected by the software driving the video projector 40 in the process of calibration.

A rotatable reticle plate (protractor) 48 containing alignment marks 49 (see FIGS. 2A-2C) overlays the viewing screen to provide a reference for angularly aligning the image 54 of the pixilated template pattern 44 to the negative image 24 of the test part 14 and for measuring stage motions of the test part 14. An encoder 50 monitors the angular position of the rotatable reticle plate 48, and the measured angular position of the reticle plate 48 can be calibrated to the generated angular orientation of the pixilated template pattern 44 through a communications link 51 so that the angular orientation of the image 54 of the pixilated template pattern 44 tracks the angular orientation of the reticle plate 48.

Information for generating the pixilated template pattern 44 preferably arises from one or more digital machine readable files 56 containing design specifications of the test part 14 such as may be generated by a computer-aided design (CAD) system. For example, the information in the digital files 56 can include a three-dimensional model of the test part 14, which can be represented in various ways including as wireframe, surface, or solid models with topology and feature descriptions intended for guiding the manufacture of the test part 14. Generally, the CAD models inherently define the intended dimensions of the modeled test part but tolerances must sometimes be appended. The digital files 56 (e.g. CAD files) can be received directly into a computer 58 for conversion into a display template (i.e., an eCAD template) reproducible in whole or part as the desired pixilated template pattern 44, generally from a two-dimensional profile representation of the test part 14 from a given perspective, or can be converted in a separate computer and transferred into the computer 58 in the converted form. Tolerance information drawn from the digital files 56 or elsewhere can be incorporated into the two-dimensional profile representation of the test part 14 within the (eCAD) display template replacing or augmenting the intended profile boundaries of the test part 14. All or any portion of the profile representation of the test part 14 within the (eCAD) display template can be reproduced by the digital display engine 42. The tolerance boundary representations within the (eCAD) display template can be adjusted while comparing the images 24 and 54 of the test part 14 and the pixilated template pattern 44 in various symmetric or asymmetric forms, including expanding or contracting the tolerance zones to aid in comparing the test part 14 against its intended form.

The computer 58 is preferably arranged to perform a number of functions, which include (a) importing a (DXF) CAD file of the test part 14, (b) opening the CAD file on a computer monitor 59, (c) checking the units of measure and provide a means to change between English and SI metric systems, (d) providing for eliminating unwanted CAD features, (e) providing for selecting only wanted CAD features, (f) providing for building the (eCAD) display template, and (g) editing and storing the (eCAD) display template.

A two-dimensional CAD drawing of the test part 14 can be converted into the desired profile representation within the (eCAD) display template by changing the background of the CAD drawing to black and changing the lines of the CAD drawing to a specific color, line width, and style. For example, certain of the lines can be given an enlarged width to represent tolerance zone bands. Other predetermined styles can be defined for converting the lines into a form most appropriate for comparison to profile images of the test part 14.

Figure 2A:
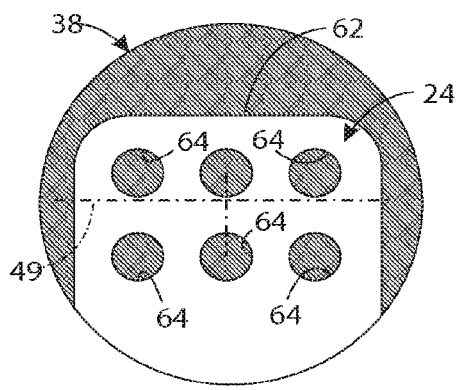
Figure 2B:
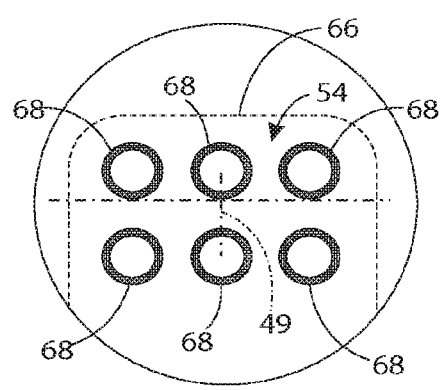

In FIG. 2A, the negative image 24 of the test part 14 is depicted with shaded zones corresponding to a pattern of illumination (preferably in green light against a black background) produced by the optical projection of the test part 14 onto the viewing screen 38. As shown, the test part 14 has an outer profile boundary 62 beyond which light passes and six bore hole features 64 through which light passes. In FIG. 2B, the pixilated template pattern 44 is shown with dashed lines and shaded zones representing illuminated features (preferably in red light against a black background) including boundary lines 66 corresponding to the intended outer profile boundary of the test part 14 and tolerance zone bands 68 setting minimum and maximum dimensions of the bore hole features of the test part 14.

Figure 2C:
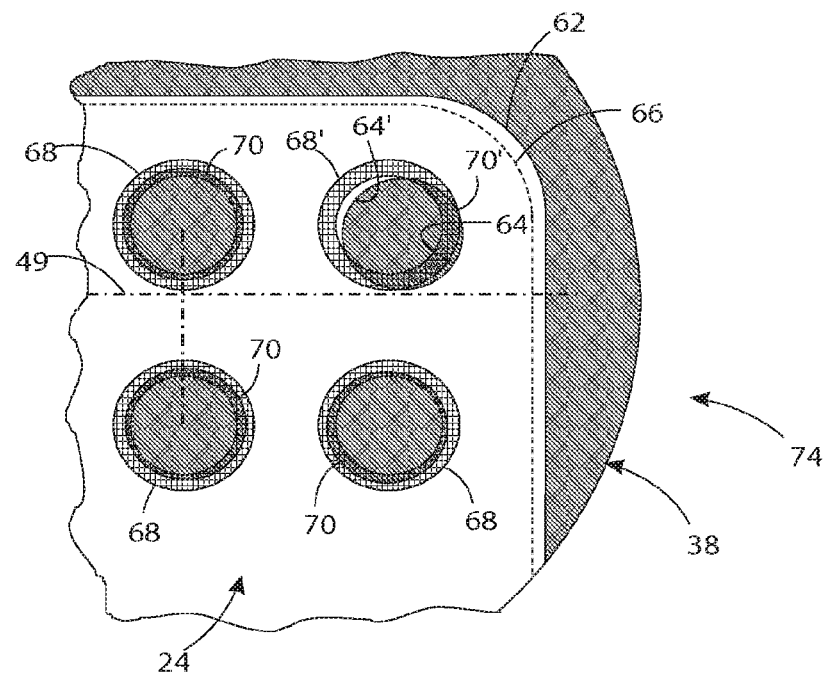

In the enlarged cut-away view of FIG. 2C, the projected image 54 of the pixilated template pattern 44 overlies the projected image 24 of the test part 14. The imaged boundary 62 of the test part 14 extends slightly beyond the imaged boundary 66 of the pixilated template pattern 44, which can be indicative of either an alignment error or an out of tolerance condition. Regions of overlap 70 between the imaged bore hole features 64 of the test part 14 and the imaged tolerance zone bands 68 of the pixilated template pattern 44 are shown in a darker shade of gray indicative of color subtraction. However, the green and red colors of the projected images 24 and 54 of the test part 14 and the pixilated template pattern 44 preferably combine by color addition into a brighter color yellow.

All but one of the bore hole features 64 are within tolerance, which is visually indicated in two ways. First, the regions of overlap 70 entirely surround the bore hole features 64, which confirms that the minimum radial dimensions of the bore hole features 64 are within the tolerance zone bands 68. Second, the tolerance zone bands 68 entirely surround the regions of overlap 70 and no portions of the bore hole features 64 extend beyond the tolerance zone bands 68, which confirms that the maximum radial dimensions of the bore hole features remain within the tolerance zone bands 68.

However, the bore hole feature referenced as 64' is out of tolerance in both respects. First, the region of overlap 70' does not completely surround the bore hole feature 64'. Second, a portion of the bore hole feature 64' extends beyond the region of overlap 70'. Thus, one part of the bore hole feature 64' does not meet the minimum radial dimension tolerance and another part of the bore hole feature 64' does not meet the maximum radial dimension tolerance, both because the bore hole feature 64' is mispositioned. In the red-green-black color scheme representative of color addition, a black break in the surrounding yellow region of overlap 70 indicates an out of tolerance condition with respect to the minimum radial dimension and a green break in the surrounding red tolerance zone band 68 indicates an out of tolerance condition with respect to the maximum radial dimension.

While the optical resolution of the projected negative image 24 of the test part 14 can be quite high, limited largely by the optical transfer function of the projector optics, the resolution of the projected image 54 of the pixilated template pattern 44 is limited by the pixel density of the digital display engine 42, which generates the original image of the pixilated template pattern 44. That is, even if the optics of the video projector 40 are as good as the optics of the optical projector 21, the pixel density with which the original pixilated template pattern 44 is generated limits the resolution of the projected image 54 of the pixilated template pattern 44. On the viewing screen 38, the spacing between pixels in the projected image 54 is generally a product of the spacing between the pixels in the pixilated template pattern 44 and the magnification of the projection lens 46 required to substantially fill the viewing screen 38. In comparison, any loss in resolution associated with the magnification of the projected image 24 of the test part 14 by a conventional optical projector is expected to the relatively inconsequential.

The optical comparator 10 is preferably arranged for inspecting the test part 14 at different magnifications. The magnification lens 30 includes a turret 32 of different power lenses 31 that can be rotated into the projection path. Although the resolution of the projected image 54 of the pixilated template pattern 44 is limited, the resolution of the projected image 54 in units of the distances represented scales with the magnification required to match the magnification of the projected negative image 24 of the test part 14. Since the optics for projecting the image 54 of the pixilated template pattern 44 are separate from the optics for projecting the negative image 24 of the test part 14, the required change to the magnification of the projected image 54 can be accomplished by generating a smaller portion of the (eCAD) display template at a larger size with the digital display engine 42. The digital display engine 42 of the video projector 40 can magnify the template pattern 44 by generating a digital image of a smaller portion of the (eCAD) display template using the same number of pixels, which are projected at the same optical magnification onto the viewing screen 38. Since the same number and size of pixels are available for filling the available field of projection, the resolution of the projected image 54 of the template pattern 44 relates directly to the scale at which the pixilated template pattern 44 is generated. For example, if magnification is doubled, the resolution of the projected image 54 of the pixilated template pattern 44 is also preferably doubled.

Figure 3A:
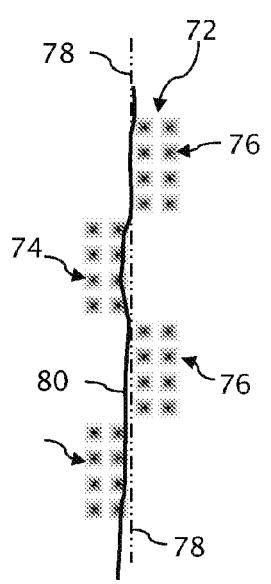
FIGS. 3A and 3B depict alternating sets of pixels for forming a boundary and a tolerance zone against which a boundary of the test part can be measured to sub-pixel resolution.
Figure 3B:
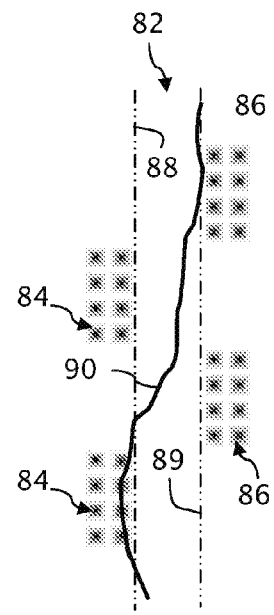

Although template pattern resolution scales directly to magnification, the resolution of the projected image 54 of the pixilated template pattern 44 is limited at a given scale for comparing the projected images 24 and 54 of the test part 14 and the pixilated template pattern 44. For improving measurement precision at a given magnification, the pixels representing the boundary lines and tolerance zones can be arranged in laterally staggered sets of pixels as shown in FIGS. 3A and 3B. A segment of a greatly enlarged boundary line 72 is shown in FIG. 3A composed of laterally staggered sets of pixels 74 and 76 defining an implicit nominal boundary line 78 between them. The staggered sets of pixels 74 and 76 define the implicit boundary 78 between adjacent pixels. An edge boundary 80 of a test part 14 divides the laterally staggered sets of pixels 74 and 76 into different size areas of fractional pixel dimensions whose relative sizes can be assessed to more precisely compare the edge boundary 80 to the implicit boundary line 78.

Similarly, the boundaries of a tolerance zone band 82 can be represented by laterally staggered and offset sets of pixels 84 and 86 as shown in FIG. 3B. The inner edges of the pixel sets 84 and 86 define implicit boundaries 88 and 89 at the outer limits of the tolerance zone band 82. Any breach of the intended tolerance zone band 82 by the edge boundary 90 of the test object is made more readily apparent. Overlapping additive or subtractive color combinations between the pixilated boundary lines 72 or tolerance zone bands 82 and the imaged test part 14 can also enhance the visual comparisons.

The images formed by the digital display engine 42 are preferably not limited to pixilated template patterns but can also include any of a number of computer generated graphics or text. For example, information concerning the test part 14, including instructions for setting up the comparator and inspecting the test part 14 can be projected onto the viewing screen 38. In fact, the viewing screen 38 can be arranged as an interactive desktop for the computer 58. For example, a computer mouse (not shown), whose location is visible on the viewing screen 38 can be used to operate menus and open or close files. A keyboard (also not shown) can be similarly connected to the computer 58 for inputting information into the computer 58, which can be visibly represented on the viewing screen 38.

Figure 4:
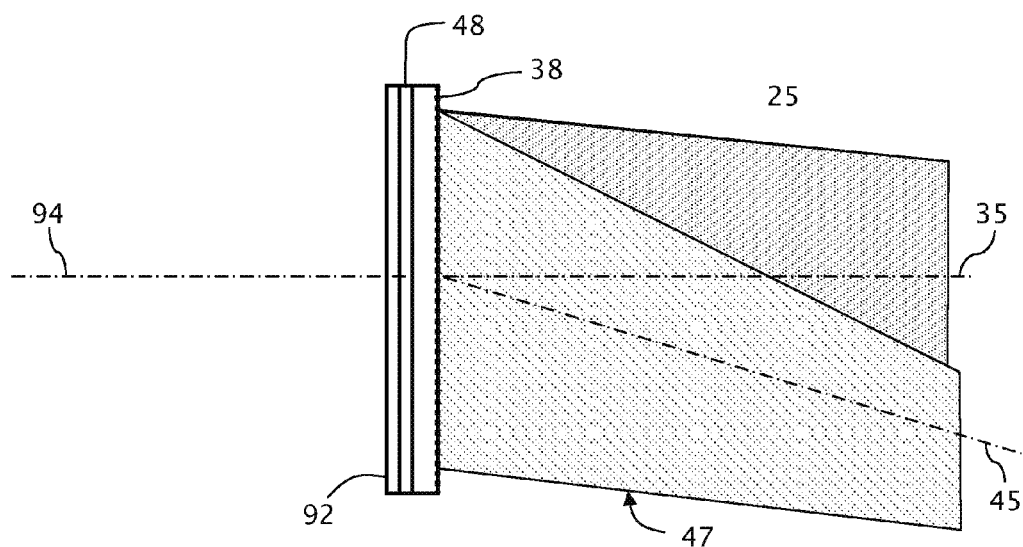
FIG. 4 is a side view of the viewing screen showing the effect of a Fresnel lens plate for combining the images of the test part and the pixilated template pattern for viewing through a range optimal viewing positions.

In addition to the reticle plate 48, a lens plate 92 as shown in FIG. 4 can also overlay the viewing screen 38 for regulating the directions of light emanating from the viewing screen 38. The lens plate 92, which can take the form of a segmented lens or grating, is preferably a Fresnel lens arranged for directing the imaged light through a range of optimum viewing positions. The lens plate 92 can be arranged to combine the light energies of the optical and video projection beams 25 and 47, which nominally approach the viewing screen 38 along different projection axes 35 and 45, and to direct the combined light energies emanating from the viewing screen 38 along a common viewing axis 94. The alignment of light energies between the projection beams 25 and 47 allows for more uniform comparisons of color and contrast over the entire viewing screen 38 throughout the range of optimum viewing positions.

Figure 5:
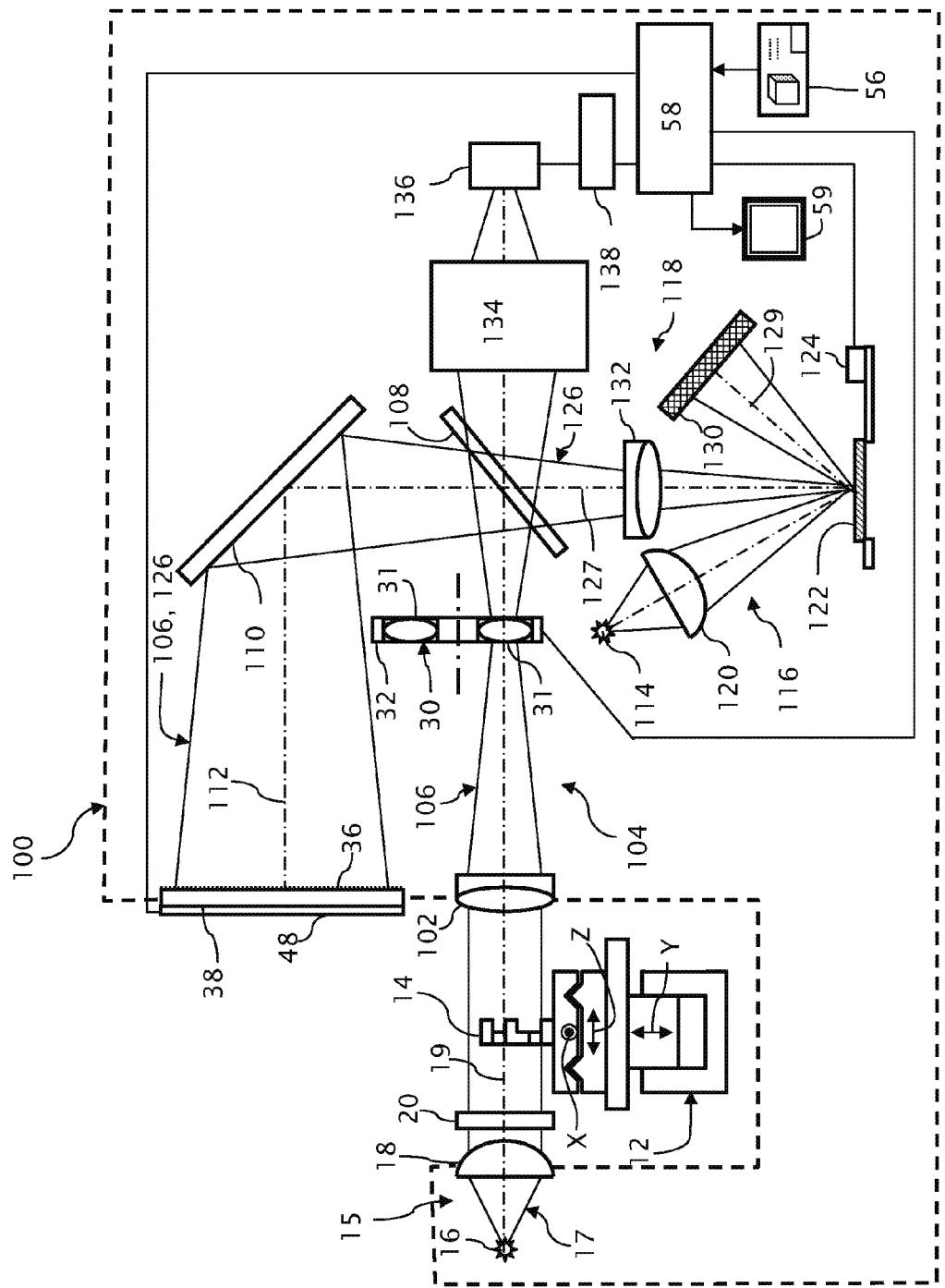
FIG. 5 is a diagram of an alternative optical comparator combining certain optics of an optical projector and a video projector for projecting images of the test part and the pixilated template pattern along a common path to the viewing screen.

An alternative optical comparator 100 arranged in accordance with the invention is depicted in FIG. 5. Components of the optical comparator 100 in common with components of the optical comparator 10 are labeled by the same reference characters. For example, the comparator 100 includes the same mounting stage 12, backlight (profile) illuminator 15, and transmitting viewing screen 38. A front relay lens 102 functions as an objective of an optical projector 104 for collecting the patterned light from the illuminator 15 and forming a negative image of the test part 14. The magnification lens 30 resizes the negative image for projection within an optical projection beam 106 onto the viewing screen 38. A beamsplitter 108 together with folding mirror 110 redirects the optical projection beam 106 along a projection axis 112 normal to the viewing screen 38.

Within a digital display engine 116 of a video projector 118, a separate light source 114, preferably one or more (red) light emitting diodes (LEDs), operates through a condenser 120 for illuminating a digital micromirror device (DMD) 122. An associate processor driver 124, which receives instructions from the computer 58, controls operation of the digital micromirror device 122 for generating pixilated template patterns 44 or other digital images. The digital micromirror device 122 includes an array of mirrors that are individually addressable by the processor driver 124 for switching between positions for achieving desired spatial distribution of light within a video projection beam 126. In one position, the individually addressable mirrors reflect portions of the incident light in a direction along an axis 127 of the video projection beam 126. In another position, the individually addressable mirrors reflect the remaining portions of the incident light in a direction along an axis 129 to a beam dump 130. A projection lens 132 forms a magnified image 54 of the pixilated pattern 44 generated by the digital micromirror device 122 for projection onto the viewing screen 38. The beamsplitter 108 combines the video projection beam 126 with the optical projection beam 106 for propagation together along the projection axis 112 to the viewing screen 38.

The integration of the video projector 118 with the optical projector 104 enables both the video projection beam 126 and the optical projection beam 106 to approach the viewing screen 38 along the common projection axis 112. The relative light intensities between the projected images remain consistent over a wider range of viewing angles.

A zoom lens 134 operating in reverse through the beamsplitter 108 relays images of both the backlit test part 14 and the frontlet digital micromirror device 122 to a camera 136. A video processor 138 can be used to link the camera 136 to the computer 58 for monitoring the inspection of individual test parts. Since images of both the test part 14 and the pixilated template pattern 44 are digitally captured by the camera 136, direct numeric comparisons can be made to at least approximately align and scale the images, manage inspection protocols, and record results. However, the finer measurements and comparisons are preferably made by visual reference to the viewing screen 38, where the resolution of the image 24 of the test part 14 has not been subjected to a digital approximation.

Figure 6:
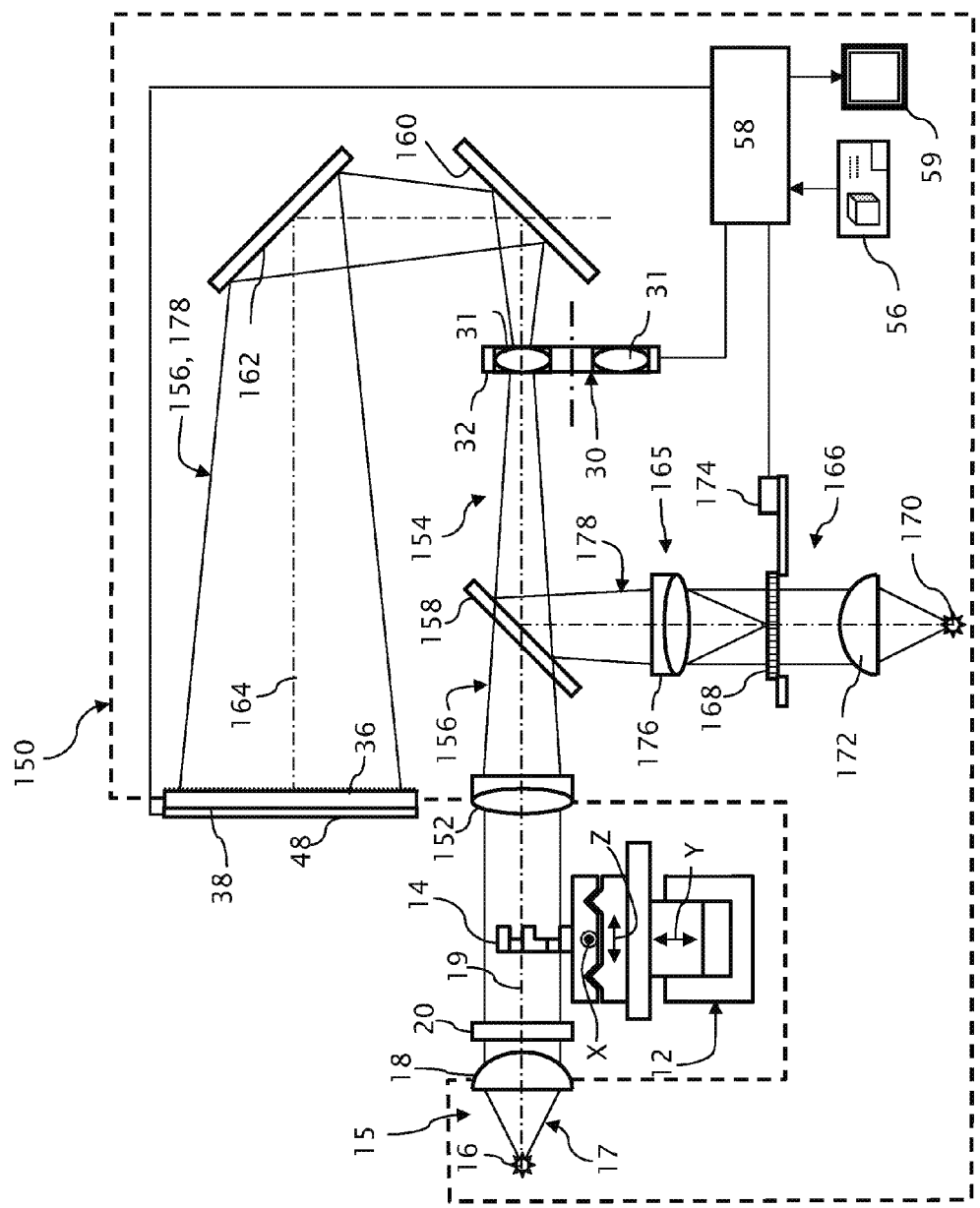
FIG. 6 is a diagram of another alternative optical comparator that combines an optical projector and a video projector in advance of a magnification lens for projecting images of the test part and the pixilated template pattern along a common path to the viewing screen.

Another example of an optical comparator arranged in accordance with the invention is depicted in FIG. 6. The same reference characters identify features in common with the optical comparators 10 or 100. Similar to the optical comparator 100, a front relay lens 152 of the depicted optical comparator 150 functions as an objective of an optical projector 154 for collecting the patterned light from the illuminator 15 and forming a negative image of the test part 14. The magnification lens 30 resizes the negative image for projection within an optical projection beam 156 onto the viewing screen 38. The optical projection beam 156 transmits through a beamsplitter 158 and is redirected by folding mirrors 160 and 162 along a projection axis 164 normal to the viewing screen 38.

An alternative digital display engine 166 for a video projector 165 includes a backlit liquid crystal display (LCD) 168 as a spatial light modulator. Light from a light source 170, preferably formed by one or more (red) light emitting diodes, passes through a condenser 172 that evenly illuminates the liquid crystal display 168. Liquid crystal cells arranged in an array within the display 168 are individually addressable by the processor driver 174 for switching between states of enabling or disabling the passage of light through the cells of the liquid crystal display 168. The processor driver 174 receives information from the computer 58 for generating the desired pixilated template patterns 44 or other images in the liquid crystal display 168. A projection lens 176 forms a magnified image of the pixilated template pattern 44 generated by the liquid crystal display 168 within a video projection beam 178 for projection onto the viewing screen 38. The beamsplitter 158 combines the video projection beam 178 with the optical projection beam 156 for propagation together along the projection axis 164 to the viewing screen 38.

In contrast to the optical comparators 10 and 100, the magnification lens 30 of the optical comparator 150 magnifies both the projected image 24 of the test part 14 and the projected image 54 of the pixilated template pattern 44 generated by the digital display engine 166. The arrangement may be useful for simplifying the combination of the optical and video projection beams 156 and 178 in situations were a lower resolution of the pixilated template pattern 44 is tolerable at higher magnifications.

The pixilated template pattern 44 containing illustrated specifications of the test part 14 can be integrated to various degrees within the optical comparators 10, 100, and 150. For example, the pixilated template pattern 44 can be coupled or not coupled to the image 24 of the test part 14, coupled or not coupled to the multi-axis stage 12, coupled or not coupled to the rotatable reticle plate 48, and coupled or not coupled to the magnification (e.g., rotational position of the turret 32) of the optical projector 21 or 104.

In an uncoupled condition, the magnification and orientation of the pixilated template pattern 44 can be set within the video projector 40 or 118 and an operator can move the test part 14 with respect to a stationary pixilated template pattern 44 for making visual comparisons similar to comparisons made with a conventional over-screen physical template. If the operator wants to inspect a portion of the test part 14 beyond the boundaries of the pixilated template pattern 44, the pixilated template pattern 44 can be regenerated from the (eCAD) display template to represent another (i.e., relatively shifted) portion of the test part 14. Keyboard or mouse (not shown) inputs to the computer 58 can be used to control the corresponding template shift.

With input concerning the magnification power of the optical projector 21 or 104, the (eCAD) display template reproducible in whole or part as the pixilated template pattern 44 can be automatically scaled to match. Similarly, with input concerning the rotational position of the rotatable reticle plate 48, the pixilated template pattern 44 can be automatically oriented to match. The image 54 of the pixilated template pattern 44 can be aligned with the image 24 of the test part 14 by referencing two feature locations in the (eCAD) display template to the same two feature locations on the test part 14. In addition, translations supported by the multi-axis stage 12 can be scaled to corresponding translations of the pixilated template pattern 44 (i.e., the regeneration of different portions of the underlying (eCAD) display template). The feature alignment and stage scaling couples the images 24 and 54 of the test part 14 and the pixilated template pattern 44, and together, the pixilated template pattern 44 tracks motions of the test part 14 as translated by the stage 12.

The coupling of the images 24 and 54 of the test part 14 and the pixilated template pattern 44 can be accomplished as follows. Select a first reference feature from the (eCAD) display template, such as a line, circle, or corner. Align the same corresponding reference feature on the test part 14 to an optical centerline of the viewing screen, and send an output string to the computer 58. The string, which preferably originates from digital readouts (DRO's) collected from onboard encoders, can include information for identifying the X and Y coordinate positions of the multi-axis stage 12 from a home position, the rotational angle θ of the rotatable reticle plate 48, the magnification of the magnification lens 30 of the optical projector 21 or 104, and an indication as to whether the eCAD template is to be coupled or uncoupled to the motion controls of the optical comparator 10, 100, or 150. Select a second reference feature from the (eCAD) display template. Align corresponding reference feature on the test part 14 to an optical centerline of the viewing screen, and send an output string with similar types of information to the computer 58. Based on this information, the pixilated template pattern 44 rotates to the angle of the test part 14 on the viewing screen and displays a scaled portion of the (eCAD) display template at the same magnification as the optical projector 21 or 104 as selected by the operator. In addition, the (eCAD) display template can be automatically scaled and centered relative to the viewing screen centerline for closely matching the projected image 24 of the test part 14.

The (eCAD) display template, as reproduced by the video projector 40, 118, 165 as the pixilated template pattern 44 is preferably a negative of the underlying CAD drawing. For example, the background of the drawing should be black and the lines defining the test part 14 can be in a color chosen by the operator on the computer 58. Once the test part 14 and the (eCAD) display template are coupled together, the computer 58 can be arranged to periodically poll for any changes in the parameters in the string to know when the operator has relatively moved the test part 14, such as by turning table position knobs or by operating the joystick.

An operator can make comparisons between the test part 14 and the pixilated template pattern 44 in either a coupled or uncoupled mode. In the coupled mode, the image 54 of the pixilated template pattern 44 moves together with the image 24 of the test part 14 as translated by the motion stage 12. In the decoupled mode, the image 54 of the pixilated template pattern 44 remains stationary on the projector viewing screen 38 while the image 24 of the test part 14 translates across on the viewing screen 38. In either mode, the image 54 of the pixilated template pattern 44 can be scaled automatically to provide a field of view matching the size as the projected image 24 of the test part 14 at the magnification selected by the operator. In the uncoupled mode, the angular orientation of the image 54 of the pixilated template pattern 44 can be set to track the rotation of the rotatable reticle plate 48 independently of the orientation of the test part 14. The operator can choose to display of the X and Y coordinate values of the stage 12 or the rotational angle θ of the rotatable reticle plate 48 as measures taken from a nominal location of a feature or feature group when the operator moves the test part 14 to a best fit position relative to the projected pixilated template pattern 44.

The projected image from the digital display engine 42 can include a window on the display screen 38 for displaying instructions to the operator for set-up and other messages that can be projected onto the viewing screen 38 in a dialog window to guide the inspection process. This facility can be used to help the operator orient the part for inspection and call attention to important features on the (eCAD) display template. Status information can also be provided such as "COUPLED" or "DECOUPLED" to avoid confusion. Dimensions and/or tolerances can be attached to features using fly-outs to provide numeric data about important features. Software for the computer 58 can provide a "GO TO" function for exercising computer numeric control (CNC) over the X and Y motions of the stage 12 and relatively moving the test part 14 through a sequence of locations automatically.

The GO TO function for the computer numeric control (CNC) over the X and Y motions of the stage 12 can be programmed into the computer 58 by inputting various destinations of the test part 14 at which comparisons are to be made. The entire (eCAD) display template (or at least the portion of the template containing desired locations for comparison) can be displayed on the viewing screen while a field of view (FOV) circle sized to the selected scale of the intended comparison overlies the (eCAD) display template. The field of view (FOV) circle can be positioned over the image of the eCAD display template and the center of the circle can become a programmed destination when the operator saves the position.

For measuring other regions of the test part, the operator can drag the FOV circle to various points on the eCAD display template and save these locations for later or immediate playback. At run time, the sequence of stage locations can be stepped through in turn. When the system is in COUPLED mode, the pixilated template pattern 44 generated from the eCAD display template remains in place over the nominal center of the projected image 24 of the test part 14 automatically.

After each move, the operator can DECOUPLE and jiggle the image 54 of the test part 24 into tolerance by moving the stage 12 and rotating the reticle plate 48 until a best fit situation is found. The operator can select CONTINUE to re-couple the images of the test part 14 and the pixilated template pattern 44 and move to the next pre-programmed stage location.

Figure 7:
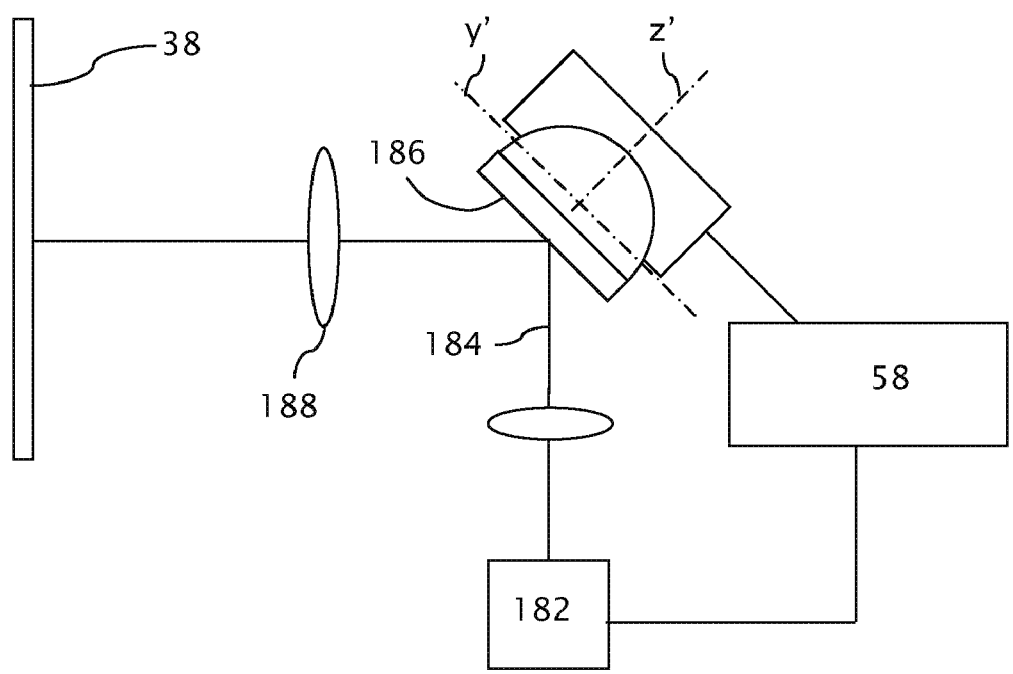
FIG. 7 is a diagram of a laser projector for projecting images of the template pattern onto the viewing screen.

Although the digital display engines 42, 116, and 166 of the video projectors 40, 118, and 165 preferably include arrays of addressable elements for producing the pixilated template patterns 44, similar digital template patterns can generated by laser beam steering devices of conventional laser projectors. For example, as shown in FIG. 7, a mirror 186 of a laser projector 180, which is pivotable about two orthogonal axes y' and z', can be used to steer a collimated laser beam 184 from a laser source 182 for tracing the template pattern. The computer 58 can be arranged to convert the desired template pattern derived from the CAD model into the required file format for the laser projector 180. When operated with sufficient tracing speed together with a sufficient refresh rate, the controlled trajectory of the laser beam 184 can be used to project a continuous glowing image of the template pattern on the viewing screen 38. The image of the template pattern can be traced directly onto the viewing screen 38 or through the intermediacy of focusing optics 188.

A laser projector of a type that could be used for purposes of the subject invention is disclosed in US Patent Application Publication No. 2009/0128717 of Nagashima et al. Although Nagashima et al.'s laser projector is arranged for projecting images in multiple colors, a single color may suffice for projecting a template pattern in accordance with this invention. U.S. Pat. No. 7,433,796 to Behan et al. discloses a laser projector and system for converting engineering data concerning fasteners generated using tools such as CAD/CAM-type applications into both geometric and non-geometric data for projection with a laser projector onto objects intended for manufacture with the fasteners. Both the Nagashima et al. application and the Behan et al. patent are hereby incorporated by reference.

Instead of projecting images onto the back of a transmissive viewing screen, the optical and video projectors of the optical comparators could be arranged for projecting images onto the front of a reflective viewing screen. Many other such variations and modifications will be apparent to those of skill in the art within the overall teaching of this invention.

The invention claimed is:

1. A method of inspecting a test part comprising steps of
   mounting a test part on a programmable motion stage,
   generating with the digital display engine a pixilated template pattern representing the test part,
   identifying a succession of measurement positions and fields of view within the pixilated template pattern as programmed destinations of the motion stage,
   coupling the pixilated template pattern to the programmable motion stage for concerted movement,
   automatically moving the test part to a first of the succession of the programmed destinations and projecting a magnified optical image of the test part onto the viewing screen at a common scale with the projected optical image of the pixilated template pattern,
   decoupling the programmable motion stage from the pixilated template pattern for relatively adjusting the position of the test part on the motion stage at the first programmed destination for comparing the images of the template pattern and test part, and recoupling the programmable motion stage to the pixilated template pattern for automatically moving the test part to a next of the succession of programmed destinations.

2. The method of claim 1 in which the step of identifying includes positioning a field of view circle over the image of the pixilated template pattern for identifying the measurement positions and the fields of view within the pixilated template pattern.

3. The method of claim 2 in which the center of the field of view circle identifies the measurement position within the pixilated template pattern and the size of the field of view circle identifies the common scale at which the test part and pixilated template pattern are projected onto the viewing screen.

4. The method of claim 1 in which the projected optical images of the test part and the pixilated template pattern are projected at a common scale by changing the size of the generated pixilated template pattern that is projected onto the viewing screen to match a changed magnification of the projected optical image of the test part, wherein the size of the generated pixilated template pattern is changed by generating a digital image of a smaller portion of the template pattern such that the smaller portion of the template pattern is reproduced to a higher resolution.

5. The method of claim 1 in which the step of coupling includes coupling the pixilated template pattern to a magnification adjuster within an optical projector for changing magnification of the image of the test part projected onto the viewing screen.

6. The method of claim 5 in which the step of coupling links the magnification adjuster to the video projector so that the image of the pixilated template pattern on the viewing screen changes in magnification matching changes in the magnification of the image of the test part on the viewing screen.

7. The method of claim 1 in which the pixilated template pattern is projected onto the viewing screen with a video projector and including a step of linking the video projector to a computer so that the video projector can project images generated by the computer onto the viewing screen.

8. The method of claim 7 including a step of projecting onto the viewing screen images of an interactive desktop that supports communication protocols with the computer.

9. The method of claim 1 in which the step of generating includes generating with the digital display engine the pixilated template pattern representing the test part by converting the specifications from the one or more digital files into the pixilated template pattern including converting information concerning boundaries of the test part in the one or more digital files into one or more tolerance zone bands in the pixilated template pattern.

* * * * *